United States Patent [19]
Merle et al.

[11] Patent Number: 4,635,056
[45] Date of Patent: Jan. 6, 1987

[54] DEVICE FOR THE DIMENSIONAL TESTING OF THE CENTER DISTANCE BORES OR OF TWO CYLINDERS

[75] Inventors: Etienne Merle; Hubert Genton, both of Lyons, France

[73] Assignee: Framatome & Cie., Courbevoie, France

[21] Appl. No.: 643,946

[22] Filed: Aug. 24, 1984

[30] Foreign Application Priority Data
Aug. 26, 1983 [FR] France ............................. 83 13768

[51] Int. Cl.$^4$ ............................................. G08C 19/08
[52] U.S. Cl. .............................................. 340/870.36
[58] Field of Search .............. 340/870.36; 376/340, 376/341, 342; 33/181 R, 503, 555, 556, 557, 560, 561, 572, 143 L, 143 M, 158, 148 H, 149 J

[56] References Cited
U.S. PATENT DOCUMENTS
2,697,880 12/1954 Tandler .................... 33/520
3,210,856 10/1965 Murphy ................... 33/520 X
3,295,218 1/1967 Chenowith ............... 33/174
3,352,021 11/1967 Leach ....................... 33/174

FOREIGN PATENT DOCUMENTS
1093565 11/1960 Fed. Rep. of Germany .
2484628 12/1981 France .

Primary Examiner—Jerry W. Myracle
Attorney, Agent, or Firm—Pollock, Vande Sande & Priddy

[57] ABSTRACT

Device for the remote control of the center distance of two bores or two cylinders with parallel axes in a structure with high dimensional accuracy, comprising a base plate (24) having a part (24a) for the accurate positioning of the device, two centering pins (26, 27), engageable in a perfectly coaxial position on the bores or cylinders (22, 23), two unit assemblies (33, 32') each carrying one of the pins (26, 27), articulated for moving the pins (26, 27) in any direction at right angles to the axes of the bores or cylinders (22, 23) and a distance detector transmitting transducer (50) fixed on a support (45) fixed integrally to one of the pins (26) and joined to the other pin (27) with some play in the direction of the center distance. The rod (51) of the detector (50) is directed along the direction of the center distance and its end is in contact with the pin (27). The device applies, particularly, to the control of the upper internal parts of a pressurized water nuclear reactor.

7 Claims, 5 Drawing Figures

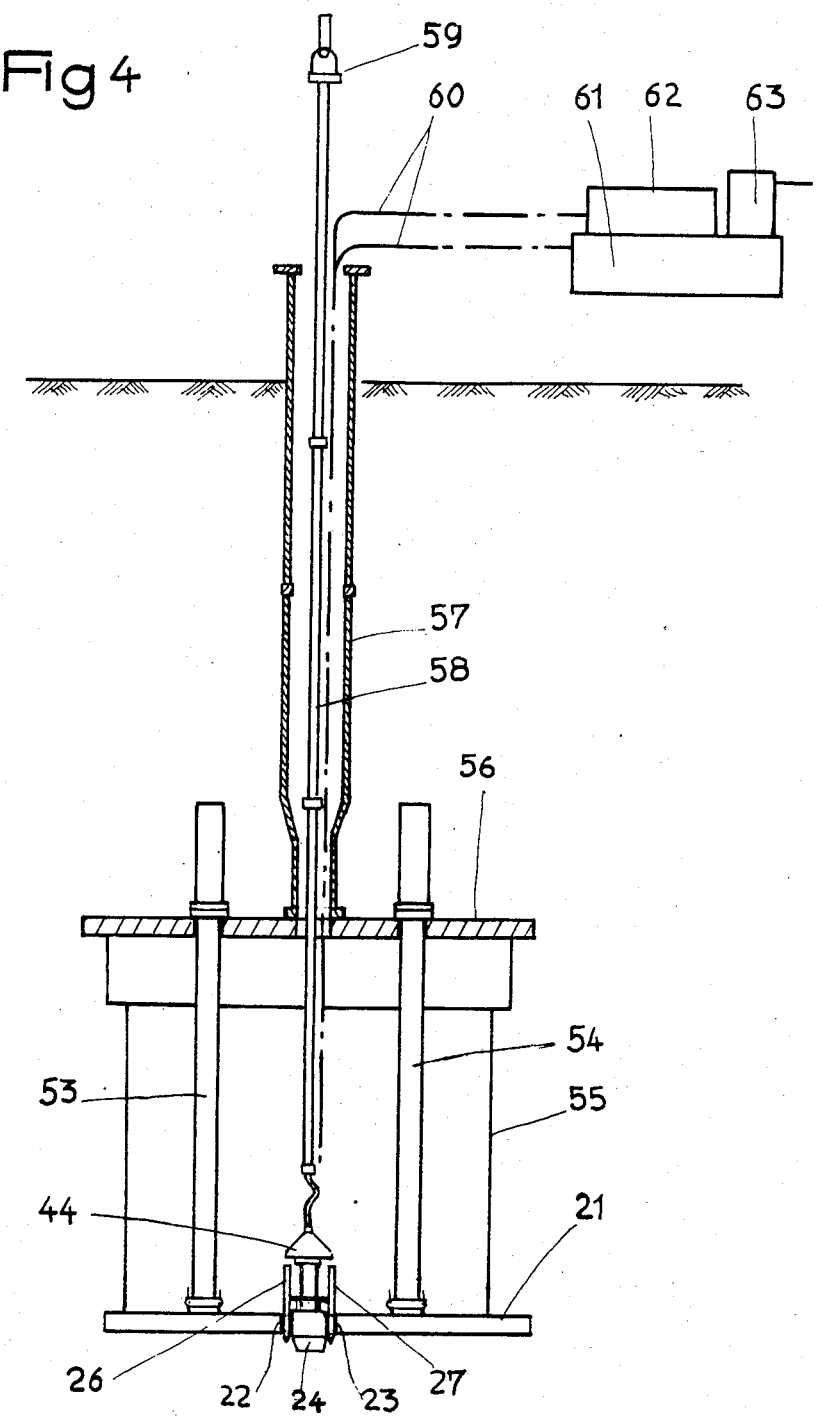

DEVICE FOR THE DIMENSIONAL TESTING OF THE CENTER DISTANCE BORES OR OF TWO CYLINDERS

FIELD OF THE INVENTION

The invention relates to a device for the remote control of the center distance of two bores or two cylinders with parallel axes in a structure with high dimensional accuracy.

In the repair or maintenance of nuclear reactors, there is an occasional need to control the distance between two axes of bores or of cylindrical parts in the internal structure of the reactor. After the reactor has been operating for some time, these components are contaminated and radioactive, so that the control operations may require the presence of an operator in a zone of high radiation intensity. The operator can then remain for only a very short time in the zone in which he is carrying out the control. The control procedure is therefore very difficult to organize and the total time for controlling a structure can be very long.

In some cases, the components to be controlled remain in the reactor vessel which is filled with water while the reactor is being maintained, and communicates with the reactor pool. It is impossible to carry out manually the control operations on the parts inside the vessel without disassembling and withdrawing these components, which assumes operations which are long and difficult to implement. It is also necessary to decontaminate the components withdrawn from the vessel to be able to carry out the dimensional control.

In the case of the upper internal equipment of pressurized water nuclear reactors, it is necessary to control the center distance of the bores arranged in the upper plate of the reactor core, which receive the guide pins of the guide tubes, before repositioning the lower part of the guide tubes. This operation must be carried out for each of the sets of two bores corresponding to a fuel assembly. This repeated operation must be carried out under water inside the reactor vessel. In this way it is possible to ensure the perfect correspondence between the center distances of the guide pins of the guide tubes to be repositioned and the center distance of the bores arranged in the upper plate of the core, before the guide tubes are replaced.

PRIOR ART

Until now, there has been no known device making it possible to carry out simply and from a distance this operation of controlling the center distance of the bores intended for the guide pins of the guide tubes.

More generally, there has been no known device making it possible to carry out a control of the center distance of bores or of cylindrical parts in a structure with high dimensional accuracy, such as the internal structure of a pressurized water nuclear reactor.

SUMMARY OF THE INVENTION

The aim of the invention is therefore to offer a device for the remote control of the center distance of two bores or two cylinders with parallel axes in a structure with high dimensional accuracy, a device which is easy to employ for repeated control operations and which is very safe to use.

To this end, the device comprises:

a base plate having a part which complements a part of the structure for the accurate positioning of the device, two centering pins comprising means for their engagement in a perfectly coaxial position on the bores or cylinders whose axes are parallel to the axes of the bores when the base plate is in position on the structure, two unit assemblies each carrying one of the centering pins, articulated on the base plate for moving the pins in any direction at right angles to the direction of the bore axes, and a distance detector transmitter fixed on a support fixed integrally to one of the pins and joined to the other pin so as to permit a limited relative movement of the pins in the direction of the center distance, comprising a sensing rod mounted capable of moving on the detector in the direction of the center distance corresponding to its own direction and held with its end in contact with the pin which is moveable relative to the support.

BRIEF DESCRIPTION OF THE DRAWINGS

In order that the invention may be more clearly understood, a description will now be given, by way of non-limiting example, with reference to the attached figures, of several embodiments of a control device according to the invention, of the type which can be employed for controlling center distances in the upper internal equipment of a vessel of a pressurized water nuclear reactor.

FIG. 4 shows, diagrammatically, the device in a measuring position on the upper internal parts of a pressurized water nuclear reactor.

DETAILED DESCRIPTION

Figure 1:
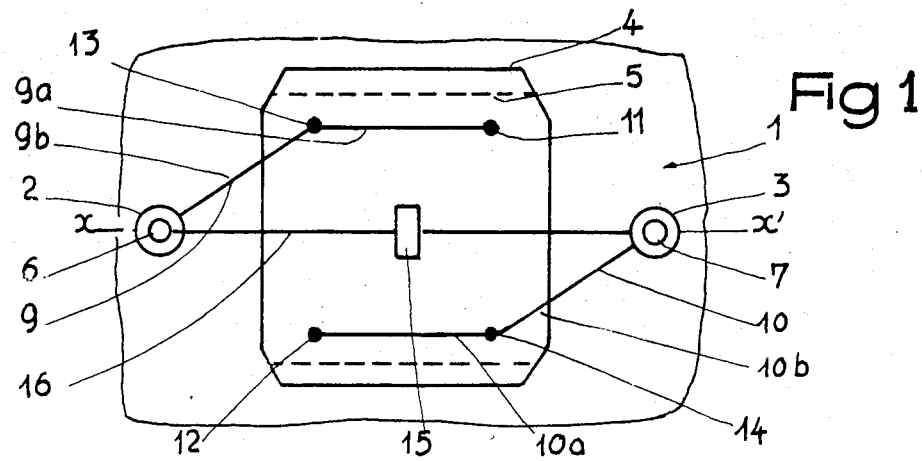
FIG. 1 shows, in plan view and very diagrammatically, the control device according to the inVention.

FIG. 1 shows a control device, represented very diagrammatically, in position on a structure 1 in which are arranged two bores 2 and 3 with parallel axes.

The control device comprises a base plate 4 having a part 5 which engages with a part of the structure 1 for the positioning of the control device relative to the bores 2 and 3.

The control device also comprises two pins 6 and 7 equipped with means (not shown) for centering inside the bores 2 and 3. The pins 6 and 7 are joined integrally to articulation assemblies 9 and 10, respectively, comprising an arm 9a (or 10a) articulated at 11 (or 12) on support 4 and an arm 9b (or 10b) articulated at 13 (or 14) on the arm 9a (or 10a). The axes 2 and 3 are fixed rigidly at the end of the arms 9b and 10b respectively.

A transducer 15 transmitting the measurement is mounted with integral fixing to a support 16 fixed rigidly on the pin 6 and joined to the pin 7 so as to allow a relative movement in the direction of the center distance xx' of the pins 6 and 7. The moveable rod of the transducer 15 is arranged and movable in the direction xx'. The end of this rod is held in contact with the moveable pin 7.

When the base plate 4 of the measuring device is positioned accurately relative to the bores 2 and 3 by means of its centering part 5, the pins 6 and 7 take up positions inside the bores 2 and 3 respectively. The device for centering these pins 6 and 7 is then actuated with the result that they become perfectly coaxial relative to the bores 2 and 3.

The small amplitude movement permitting the positioning and the centering of the pins 6 and 7 in the bores 2 and 3 is made possible by the fact that the articulated devices 9 and 10 permit a movement of the pins 6 and 7 in any direction in the plane which is perpendicular to the parallel axes of the bores 2 and 3. The center distance of the pins 6 and 7 corresponding to the center distance of the bores 2 and 3 can be fitted by moving the moveable pin 7 in the support 16 in the direction of the center distance xx'.

Before controlling the center distance of the bores 2 and 3, a standardization of the transmitting transducer 15 is carried out by placing the pins 6 and 7 in pairs of bores arranged respectively with a smaller center distance and a greater center distance than the nominal center distance to be controlled, these center distances, which bracket the nominal value, being known and determined with a very high accuracy.

It is thus possible to calibrate the movements of the sensing rod of the transducer 15 which is expressed as a measurement of a physical quantity such as an intensity or a voltage.

A description will now be given, with reference to FIGS. 2 and 3, of a particular embodiment of the device according to the invention which may be employed for controlling the center distances of bores machined in the upper plate of the core of a nuclear reactor, for installing the guide tubes of the upper internal parts of the reactor.

Figure 2:
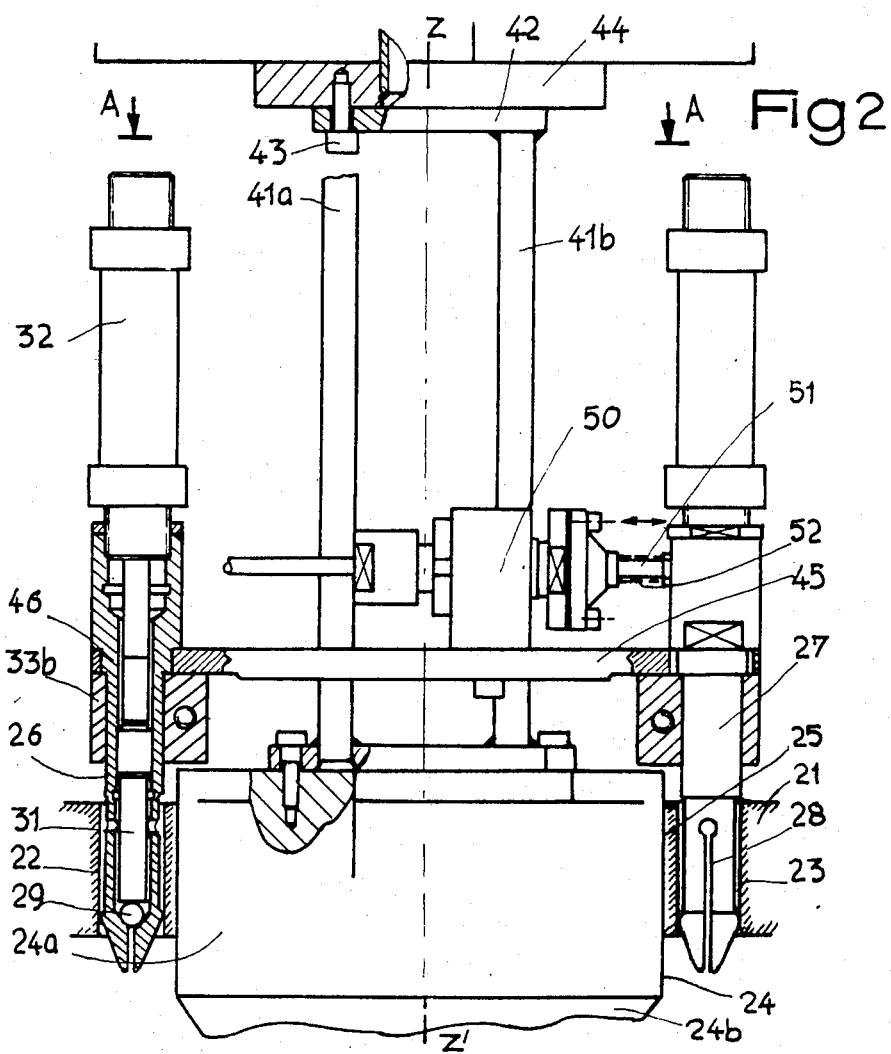
FIG. 2 shows, in elevation with partial cross-section, a device according to the invention for controlling center distances of bores in the upper plate of the core of a pressurized water nuclear reactor.

In FIG. 2, the device has been shown in in position on the upper core plate 21 of the nuclear reactor. Two holes 22 and 23 pass through this plate 21 with a certain center distance which can be controlled with the device.

Figure 3:
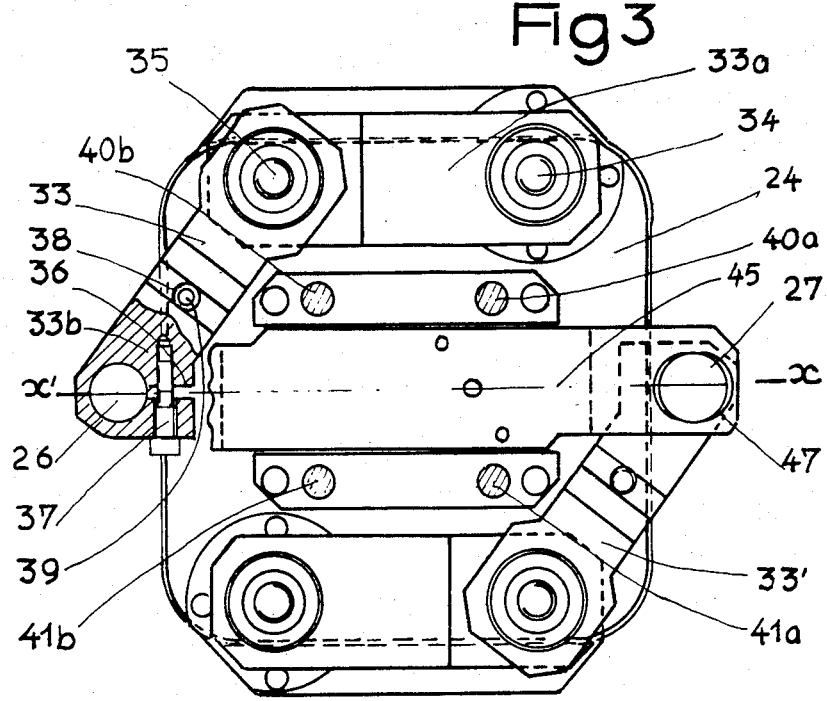
FIG. 3 shows a plan view of the device along line A—A of FIG. 2.

The device comprises a base plate 24 whose upper part 24a is in the shape of a parallelepiped rounded off in the region of its ridges, its cross-section having a square shape with rounded corners as shown in FIG. 3. This shape corresponds perfectly to the shape of the openings 25 in the upper core plate 21 arranged vertically above each of the assemblies, for passing cooling water which has circulated in the corresponding assembly. The lower part 24b of the base plate 24 has a frusto-conical shape to allow the base plate to engage inside the opening 25 when the device is positioned. Reference marks enable the device to be oriented correctly from a control station situated above the reactor pool.

The device comprises two pins 26 and 27 whose normal diameter is slightly smaller than the diameter of the holes 22 and 23 intended for positioning the guide pins of the guide tubes of the upper internal parts of the reactor.

As can be seen in FIG. 2, the pins 26 and 27 have a hollow cylindrical part which terminates at its lower end in a hollow conical part bounded internally and externally by conical surfaces. This conical end part permits both the engagement of the pins 26 and 27 in the bores 22 and 23 respectively and the centering of the pins. For this purpose, the pins 26 and 27 have a slot such as 28 in their lower part and a ball 29 in the inner conical part of the lower end of the pin. The rod 31 of a jack 32 which moves in the inner bore of the pin along its axis permits the ball 29 to be pushed downwards in the corresponding conical surface and to spread out both parts of the pin on either side of the slot 28, to obtain the centering of the pin.

The pins 26 and 27 are fixed integrally to identical articulated units 33 and 33' respectively.

The articulated device 33 will be described but it is quite obvious that the device 33' is identical in every respect and arranged symmetrically to the device 33 relative to the vertical axis ZZ' of the device, corresponding to the axis of the assembly on which the checking of the center distance of the bores 22 and 23 is carried out.

The device 33 comprises an arm 33a articulated by virtue of an articulation with a vertical axis 34 on the support 24 and an arm 33b articulated on the arm 33a by means of an articulation with a vertical axis 35. The pin 26 is fixed rigidly to the end of the arm 33b by means of a screw 37 producing the clamping of two jaws separated by a slot 36 arranged at the end of the arm 33b.

A vertical bore 38 is machined across the entire thickness of the arm 33b and a screw 39 whose diameter is appreciably smaller than the diameter of the bore 38 is fixed vertically in the base plate 24. This device makes it possible to restrict the movements of the arms 33a and 33b and hence of the pin 26 relative to the base plate 24. The device with double articulation 34 and 35 permits the pin 26 to move in any direction at right angles to the axis of this pin, that is to say any direction in the horizontal plane. However, the amplitude of this movement is restricted by the clearance of the screw 39 inside the bore 38.

The base plate 24 carries on its upper surface a unit for attaching the device comprising columns 40a, 40b, 41a and 41b as well as an upper plate 42. Screws 43 permit the plate 42 to be fixed integrally to a plate 44 forming the lower part of a unit for hoisting the control device which will be described with reference to FIG. 4.

Arranged between the pins 26 and 27 is a support 45 formed by a plate arranged horizontally so as to form an integral part of the pin 26 and engaged on the pin 27 with some play. For this purpose, the plate 45 has a circular opening at one of its ends corresponding to the outer diameter of a part of the pin 26 on which it is engaged against a shoulder 46 and held in its lower part by the arm 33b at its end which is rigidly integral with the pin 26. At its other end, the support plate 45 has an oblong opening 47 in which is engaged a part of the pin 27 so that this pin 27 can be moved slightly in the direction of the center distance of the holes 22 and 23 relative to the support 45 and hence relative to the pin 26.

A transmitting transducer 50 is placed on the support 45 so that its sensing rod 51 is directed along the center distance of the holes 22 and 23 when the device is in a control position, the end of this rod 51 being held in contact with the pin 27 by means of a return spring 52.

The transducer is of the differential transformer type, the movement of the sensing rod 51 being converted into an electric current proportional to the movement of this rod.

The measurement or the recording of this electric current permits an accurate measurement and a control of the center distance.

Shown in FIG. 4, on a very small scale, is the measuring device comprising pins 26 and 27 in position in two bores 22 and 23 of an upper core plate 21 of a pressurized water nuclear reactor, the bores 22 and 23 corresponding to the positions of two guide pins of the guide tube of a core assembly.

Also shown are two guide tubes 53 and 54 forming a part of the upper internal parts 55 of the nuclear reactor, fixed on the lower core plate 21 and on a supporting plate 56.

It can be seen that, to install the control device, a vertical guide tube 57 has been placed to correspond with the guide tube passage opening whose positioning bores on the upper core plate 21 are being verified. The guide tube 57 comprises a funnel-shaped part which separates a large diameter part from a small diameter part.

The control device described with reference to FIGS. 2 and 3 is fixed to the lower plate 44 of a hoisting device comprising a very long hoisting rod 58 and a suspension grip 59 permitting its vertical and horizontal movement by the reactor charging machine.

Measuring wires 60 permit the supply of an electric current to the transmitting transducer and the collection of the measuring current which is processed in an assembly comprising a measuring unit 61, a control console 62 and a recorder 63. This assembly rests on a platform situated above the level of the reactor pool.

To carry out the control on a pair of bores corresponding to a guide tube which is to be replaced in the upper internal parts of the reactor, the guide tube 57 is placed in position in the region of the guide tube passage hole in the supporting plate 56 and the controlling device is brought, by means of the charging machine hoist, into a position such as shown in FIG. 4. The orienting of the control device is carried out so that its support 24 is positioned in the cooling fluid passage opening of the corresponding assembly. In this position, the pins 26 and 27 are placed approximately opposite the bores 22 and 23 whose center distance is being controlled and can engage in these bores by virtue of their conical end part. This engagement is facilitated by the fact that the clearance of the axes is possible in any direction in the horizontal plane.

The jacks 32 acting through the intermediary of the rods 31 on the balls 29 to spread out the two end parts of the pin and to center the latter, are then actuated. The centering of both pins 26 and 27 can be carried out at the same time, the relative movement of these pins being possible by virtue of their articulated fixing relative to the support 24 and by virtue of the oblong opening provided in the support 45 which permits a clearance of the axes relative to each other in the direction of the center distance.

When the pins 26 and 27 are in perfectly centered position and are therefore perfectly coaxial relative to the bores 22 and 23, the stem 51 has a position which corresponds to the value of the center distance, account being taken of a preliminary calibration of the control device.

The measuring current which is a function of the position or of the movement of the stem 51 therefore represents perfectly the value of the center distance.

In the case of the center distance of the bores for positioning the two guide pins of a guide tube of a pressurized water nuclear reactor of a known type, the nominal value of the center distance is 196.85 mm. The control device is first calibrated by using a standard gage calibrated at the value of 196.5 plus or minus 0.02 mm and 197 plus or minus 0.02 mm. The two corresponding standard values of the measurement current are read, which enables a value of the center distance to correspond directly to a measured current, by interpolation.

The successive operations of installing the control device, centering this device and producing the measurement can be carried out very rapidly and from a distance with a high degree of safety.

The placing of the tool in a new control position is also very fast so that the control of all the bores for the positioning of the guide tubes of the upper internal equipment of the reactor can be carried out in a very short time.

Figure 5:
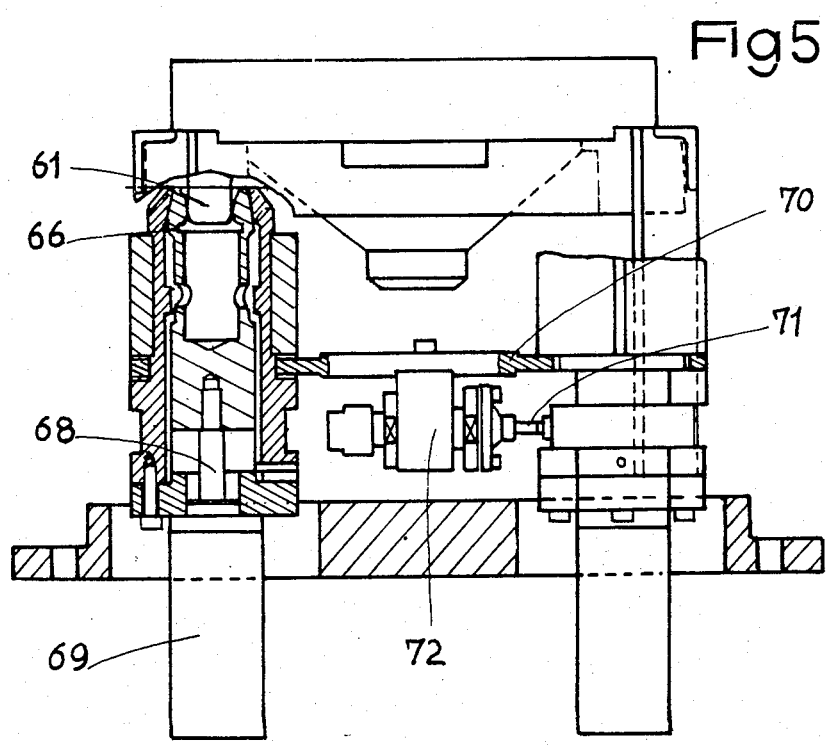
FIG. 5 shows an alternate form of the control device which can be employed for controlling center distances of cylindrical parts such as centering pins of guide tubes.

FIG. 5 shows a device according to the invention suitable for the control of the center distance of cylindrical parts such as guide pins 61 fixed on the guide tubes of the upper internal parts of a pressurized water nuclear reactor.

The general structure of the device is the same as that of the device shown in FIGS. 2 and 3 but the pins 26 and 27 consist, in this version, of tulip-shaped components such as 66 which can be distorted radially and are fixed integrally to the stem 68 of a jack 69 permitting them to move for their centering on the end of the cylindrical part 61. The device comprises a support 70 fixed rigidly on the pin carrying the tulip-shaped component 66 and with a clearance in the direction of the center distance on the other pin. The support 70 carries the transmitting transducer 72 whose stem 71 is in contact with the pin which is moveable relative to the support 70.

The operation of the device shown in FIG. 5 is practically identical to the operation of the device shown in FIGS. 2 and 3, the positioning and the centering of this device being carried out by engaging the tulip-shaped components such as 66 on the parts 61 when the jacks such as 69 are energized.

It can be seen therefore that the device according to the invention makes it possible to obtain remote control, with complete safety, of the center distance of bores or of cylindrical components forming part of a structure such as an internal structure of a nuclear reactor.

The invention is not limited to the embodiment which has just been described. Thus, the centering of the pins relative to the bores or cylindrical parts can be obtained by means other than jacks, and the positioning of the base plate of the device on the structure can be obtained by means other than male and female conical bearings machined on the base plate and the structure.

The restriction of the movements of the articulated units can also be produced in a completely different manner from that which has been described. For example, limit stops could be provided on the base plate on either side of one of the parts of the articulated device.

It is also possible to envisage a method for fixing the pins relative to the support incorporating slides and articulated arms to produce a movement with a limited amplitude in a plane at right angles to the axes of the bores or cylindrical parts to be controlled.

We claim:

1. A device for the dimensional testing of the center distance of two bores or two cylinders with parallel axes in a structure with high dimensional accuracy, which device comprises (a) a base plate (24) having a part (24a) which complements a part (25) of the structure (21) for the accurate positioning of the device, (b) two centering pins (26 and 27) comprising means (29, 31, 32) for their engagement in a perfectly coaxial position on the bores or cylinders (22, 23) whose axes are parallel to the axes of the bores (22, 23) when the base plate (24) is in position on the structure (21), (c) two unit assemblies (33, 33') each carrying one of the centering pins (26, 27), articulated on the base plate (24), for moving the pins (26, 27) in any direction at right angles to the direction of the axes of the bores (22, 23) with a restricted amplitude, and (d) a distance detector transmitting transducer (50) fixed on a support (45) fixed integrally to one of the pins (26) and joined to the other pin (27) so as to permit a limited relative movement of the pins (26, 27) in the direction of the center distance xx', comprising a sensing rod (51) mounted capable of moving on the detector (50) in the direction of the center distance xx' corresponding to its own direction and held with its end in contact with the pin (27) which is moveable relative to the support (45).

2. The device claimed in claim 1, wherein each of the articulated assemblies (33, 33') consists of an arm (33a) articulated on the support (24) and an arm (33b) articulated at one of its ends on the arm (33a) and carrying the pin (26) rigidly at its other end.

3. The device claimed in claim 2, wherein the second arm (33b) has a bore (39) in which is engaged a screw (38) fixed on the support (24) with some radial play to permit limited clearances of the arm (33b) relative to the base plate (24).

4. The device claimed in any one of claims 1 to 3, wherein the support (45) of the transmitting detector (50) consists of a plate fixed rigidly at one of its ends to one of the pins (26) and having at its other end an oblong opening (47) in which the second pin (27) engages, permitting a clearance of the pin (27) in a direction of the support (45) corresponding to the direction passing through the axes of the pins (26 and 27).

5. The device claimed in any one of claims 1 to 3, in the case of the control of the center distance of two bores, wherein the pins (26 and 27) comprise a cylindrical-conical tubular part slotted over a part of its length which is intended to engage in the bores (22, 23), and each of the means for engaging these pins in a perfectly coaxial position in the bores (22, 23) consists of a jack (32) whose rod (31) can move in the central space of the tubular pin to actuate a ball (29) for spreading apart the slotted parts of the pin (26, 27).

6. The device claimed in any one of claims 1 to 3, in the case of the control of the center distance of cylindrical parts, wherein each of the centering pins comprises a tulip-shaped component (66) deformable radially, integral with the stem (68) of a jack (69), directed along the pin axis for engaging the tulip-shaped component in a perfectly centered position on the cylindrical part (61).

7. The device claimed in any one of claims 1 to 3, wherein the transmitting transducer (50,72) is of the differential transformer type.

* * * * *